(12) United States Patent
Jeong

(10) Patent No.: US 8,184,387 B2
(45) Date of Patent: May 22, 2012

(54) MINIATURE OPTICAL SYSTEM

(75) Inventor: Jin Myoung Jeong, Sungnam (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/112,488

(22) Filed: Apr. 30, 2008

(65) Prior Publication Data

US 2008/0266677 A1    Oct. 30, 2008

(30) Foreign Application Priority Data

Apr. 30, 2007    (KR) .................. 10-2007-0041825

(51) Int. Cl.
G02B 9/34       (2006.01)
G02B 3/02       (2006.01)

(52) U.S. Cl. ........................... 359/773; 359/715

(58) Field of Classification Search .......... 359/754–762, 359/676–692, 763–770, 771–783, 708, 713–715
See application file for complete search history.

(56) References Cited

U.S. PATENT DOCUMENTS

| | | | |
|---|---|---|---|
| 6,718,132 B2 * | 4/2004 | Nishina .................. | 359/714 |
| 6,795,253 B2 | 9/2004 | Shinohara | |
| 6,885,506 B2 * | 4/2005 | Yoneyama .................. | 359/682 |
| 6,961,191 B2 | 11/2005 | Sato | |
| 7,274,518 B1 * | 9/2007 | Tang et al. .................. | 359/773 |
| 7,321,474 B1 * | 1/2008 | Jo .................. | 359/773 |
| 7,355,801 B2 * | 4/2008 | Chen et al. .................. | 359/773 |
| 7,443,610 B1 * | 10/2008 | Lin et al. .................. | 359/714 |
| 7,443,611 B2 * | 10/2008 | Shinohara .................. | 359/772 |
| 2005/0180027 A1 * | 8/2005 | Yamamoto et al. .......... | 359/781 |
| 2007/0188890 A1 * | 8/2007 | Jo et al. .................. | 359/773 |
| 2007/0242370 A1 * | 10/2007 | Fukuta et al. .................. | 359/773 |

FOREIGN PATENT DOCUMENTS

KR    10-0691624 B1    2/2007

OTHER PUBLICATIONS

Geary, Joseph M. Introduction to Lens Design: with Practical ZEMAX Examples. Richmond, VA: Willmann-Bell, 2002. p. 23. Print.*

* cited by examiner

*Primary Examiner* — Ricky Mack
*Assistant Examiner* — Zachary Wilkes
(74) *Attorney, Agent, or Firm* — Saliwanchik, Lloyd & Eisenschenk

(57) ABSTRACT

Disclosed is a miniature optical system. The miniature optical system includes a first lens; a second lens; a third lens; and a fourth lens, wherein the first to fourth lenses are sequentially aligned from an object side to an image side of the system. The lenses satisfy the following equation: $-1.5 < f2/ttl < -0.5$, where f2 is the focal length of the second lens and ttl is a distance from an object side of the first lens to an image side of the system.

15 Claims, 6 Drawing Sheets

MINIATURE OPTICAL SYSTEM

CROSS-REFERENCE TO RELATED APPLICATION

The present application claims the benefit under 35 U.S.C. §119 of Korean Patent Application No. 10-2007-0041825, filed Apr. 30, 2007, which is hereby incorporated by reference in its entirety.

BACKGROUND

Recently, a portable phone or a mobile communication terminal is equipped with a compact digital camera or a digital video camera employing a solid state image sensor, such as a CCD (charge coupled device) or a CMOS (complementary metal oxide semiconductor) image sensor. Such an image sensor has become scaled-down, so that an optical system used for the image sensor is needed to have a small size and high performance.

BRIEF SUMMARY

Embodiments of the present invention provide a miniature optical system having a compact structure with stable performance.

The miniature optical system according to an embodiment includes first to fourth lenses, which are sequentially aligned from an object side to an image side and satisfy the following equation, $-1.5 < f2/ttl < -0.5$, wherein f2 is a focal length of the second lens, and ttl is a distance from an object side of the first lens to an image side of the system.

DETAILED DESCRIPTION

Hereinafter, embodiments will be described in detail with reference to accompanying drawings.

Figure 1:
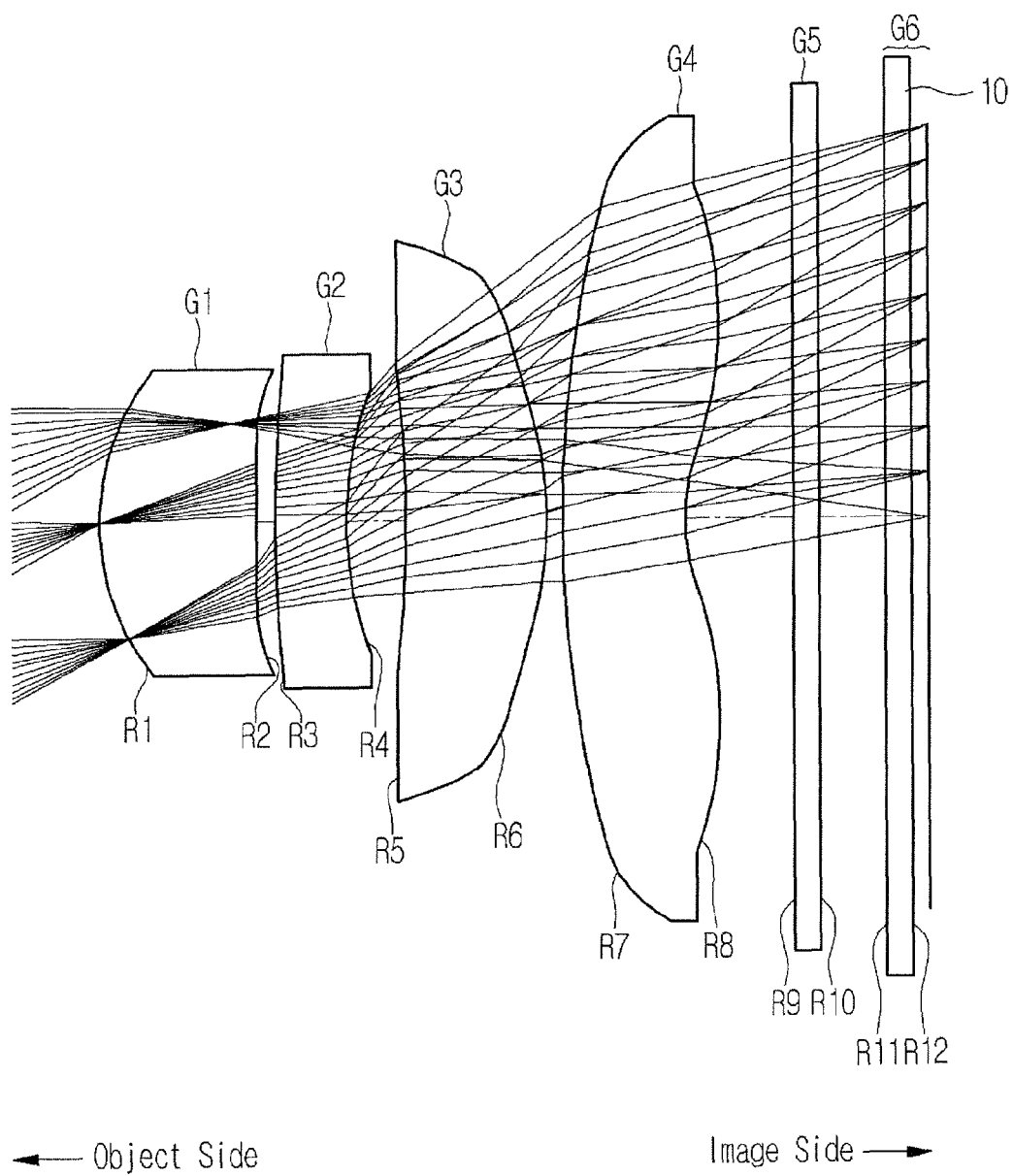
FIG. 1 is a view showing a structure of a miniature optical system according to a first embodiment.
Figure 2:
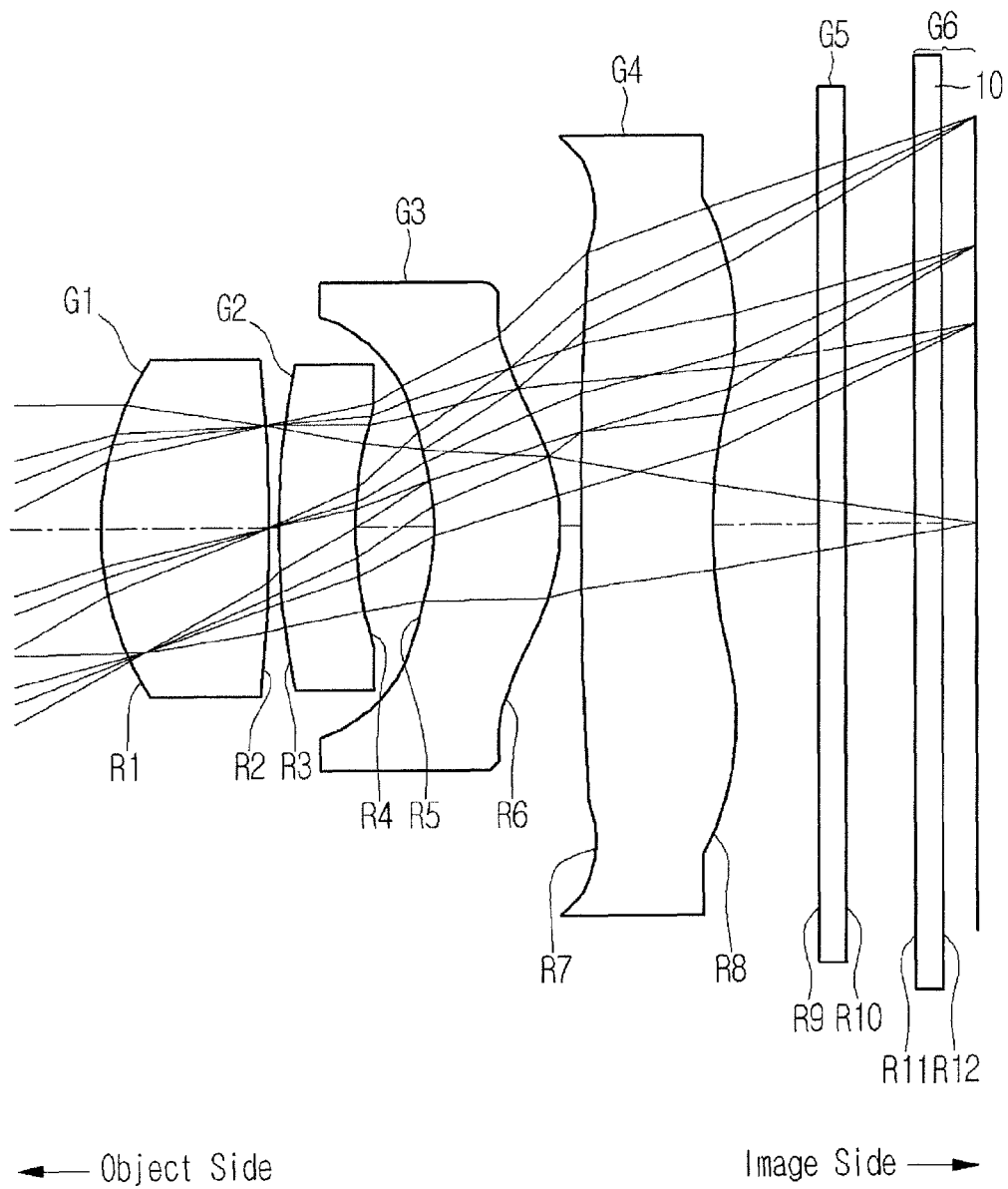
FIG. 2 is a view showing a structure of a miniature optical system according to a second embodiment.

FIG. 1 is a view showing a structure of a miniature optical system according to a first embodiment, and FIG. 2 is a view showing a structure of a miniature optical system according to a second embodiment.

As shown in FIGS. 1 and 2, the miniature optical system according to the first and second embodiments includes a first lens G1, a second lens G2, a third lens G3, a fourth lens G4, a filter G5, and a light receiving element G6.

The first to fourth lenses G1 to G4 are sequentially aligned from an object side to an image side.

The first and third lenses G1 and G3 can have positive refractive power and the second and fourth lenses G2 and G4 can have negative refractive power. In addition, the refractive power of the first lens G1 can be greater than the refractive power of each of the other lenses.

The first lens G1 can have a convex surface at the object side thereof, and the second lens G2 can have a concave surface at the image side thereof. Also, in an embodiment, the second lens G2 can have a convex surface at the object side thereof.

At least one aspheric inflection point can be formed on an image side of the fourth lens 40. The aspheric inflection point of the fourth lens 40 may adjust the maximum radiation angle of a main light incident into the light receiving element G6.

At least one of the first, third and fourth lenses G1, G3 and G4 can have an aspheric surface. According to one embodiment, the first, third and fourth lenses G1, G3 and G4 are prepared in the form of aspheric lenses.

According to an embodiment, the first, third and fourth lenses G1, G3 and G4 can include plastic materials, and the second lens G2 and the filter G5 can include glass materials.

The filter G5 is aligned between the light receiving element G6 and the fourth lens G4. The filter G5 can include an IR cut filter.

The filter G5 inhibits radiation heat of an external light from being transferred to the light receiving element G6.

That is, the filter G5 allows a visible ray to pass therethrough and reflects an infrared ray toward the outside.

In addition, the light receiving element G6, on which the image is formed, can include an image sensor that converts an optical signal corresponding to a subject image into an electric signal. The image sensor can include a CCD (Charge Coupled Device) or a CMOS (Complementary Metal Oxide Semiconductor) image sensor.

The light receiving element G6 can include a protective glass 10 for protecting the image sensor.

In a further embodiment, the miniature optical system can include an iris (not shown), which adjusts the amount of light and shields the light if the light is not necessary. For embodiments utilizing an iris, the iris can be positioned in front of an object side of the first lens G1.

The miniature optical system according to specific implementations of the first and second embodiments can have the optical characteristics as shown in Table 1.

TABLE 1

|  | First embodiment | Second embodiment |
| --- | --- | --- |
| f1 | 3.26 | 3.68 |
| f2 | −4.05 | −7.43 |
| f3 | 6.03 | 5.29 |
| f4 | −8.93 | −5.66 |
| Ttl | 6.07 | 6.19 |
| f1/ttl | 0.537068 | 0.594507 |
| f2/ttl | −0.66722 | −1.20032 |
| f3/ttl | 0.99341 | 0.854604 |
| f4/ttl | −1.47117 | −0.91438 |
| n1/ttl | 0.252059 | 0.247173 |
| n2/ttl | 0.285338 | 0.2979 |
| n3/ttl | 0.252059 | 0.247173 |
| n4/ttl | 0.252059 | 0.247173 |

In Table 1, f1 is the focal length of the first lens G1, f2 is the focal length of the second lens G2, f3 is the focal length of the third lens G3, and f4 is the focal length of the fourth lens G4. In addition, n1 is the refractive index of the first lens G1, n2 is the refractive index of the second lens G2, n3 is the refractive index of the third lens G3, and n4 is the refractive index of the fourth lens G4. Further, ttl represents the distance between an object side of the first lens G1 and an image side.

In the miniature optical system according to one specific implementation of the first embodiment, the effective focal length is 4.7792 mm, and the F-number is 2.8113. According to one specific implementation of the second embodiment, the effective focal length is 5.0252 mm, and the F-number is 2.8018.

According to an implementation of the first and second embodiments, the first lens G1 satisfies the following equation.

$$0.2 < f1/ttl < 0.7 \quad (1)$$

In the above equation, f1 is the focal length of the first lens G1 and ttl represents the distance between an object side of the first lens G1 and an image side of the system (for example, the image side of the fourth lens G4).

According to an implementation of the first and second embodiments, the second lens G2 satisfies the following equation.

$$-1.5 < f2/ttl < -0.5 \quad (2)$$

In the above equation, f2 is the focal length of the second lens G2 and ttl represents the distance between an object side of the first lens G1 and an image side of the system.

According to an implementation of the first and second embodiments, the third lens G3 satisfies the following equation.

$$0.7 < f3/ttl < 1.2 \quad (3)$$

In the above equation, f3 is the focal length of the third lens G3 and ttl represents the distance between an object side of the first lens G1 and an image side of the system.

According to an implementation of the first and second embodiments, the fourth lens G4 satisfies the following equation.

$$-1.7 < f4/ttl < -0.8 \quad (4)$$

In the above equation, f4 is the focal length of the fourth lens G4 and ttl represents the distance between an object side of the first lens G1 and an image side of the system.

The miniature optical system according to the first and second embodiments can satisfy above equations (1) to (4).

If the miniature optical system exceeds the upper limit value in any of equations (1) to (4), the refractive power of each lens may be reduced. In addition, the lens becomes sensitive, so that it is difficult to collect the chromatic aberration of the lens, lowering the productivity.

In addition, if the miniature optical system deviates from the lower limit value in any of equations (1) to (4), power of the lens may be reduced so that the lens may not exhibit desired performance. Thus, for preferred embodiments, the lenses are designed to satisfy above equations (1) to (4).

The miniature optical system according to an implementation of the first embodiment can have the optical characteristics as shown in Tables 2 and 3.

TABLE 2

| Lens side | Curvature radius | thickness | Refractive index(n) | |
|---|---|---|---|---|
| Object side | infinity | 0 | | |
| R1 | 1.8000 | 1.1600 | 1.529 | Aspheric surface |
| R2 | −39.3558 | 0.1514 | | Aspheric surface |
| R3 | 21.4133 | 0.5000 | 1.732 | |
| R4 | 2.6000 | 0.4420 | | |
| R5 | −6.1482 | 1.0426 | 1.529 | Aspheric surface |
| R6 | −2.2338 | 0.1000 | | Aspheric surface |
| R7 | 3.1508 | 0.9300 | 1.529 | Aspheric surface |
| R8 | 1.7010 | 0.7710 | | Aspheric surface |
| R9 | infinity | 0.2000 | 1.53 | |
| R10 | infinity | 0.4880 | | |
| R11 | infinity | 0.1950 | 1.53 | |
| R12 | infinity | −0.1159 | | |
| Image side | infinity | 0.2158 | | |

Table 2 shows numerical data of elements constituting the optical system according to the implementation of the first embodiment. In Table 2, the curvature radius is the curvature radius of the optical surface, and the thickness is the thickness of the optical surface expressed with a unit of mm.

According to the embodiments, an aspheric surface is defined as follows.

$$z = \frac{cy^2}{1 + \sqrt{1 - (1+k)c^2 r^2}} + Ar^4 + Br^6 + Cr^8 + Dr^{10} \quad (5)$$

where z is a distance in the direction of an optical axis from an apex point of the optical surface, y is a distance in the direction perpendicular to the optical axis, c is a curvature radius at the apex point of the optical surface, k is a conic coefficient, and A to D are aspheric coefficients.

The above definitional equation of the aspheric surface is applicable for both the first and second embodiments.

Table 3 shows numerical values of aspheric coefficients for each aspheric surface according to the implementation of the first embodiment.

TABLE 3

| | Curvature | K | A | B | C | D |
|---|---|---|---|---|---|---|
| R1 | 0.55555556 | −0.125331 | $5.74709 \times 10^{-3}$ | $1.00680 \times 10^{-2}$ | $-8.40624 \times 10^{-4}$ | 0 |
| R2 | −0.02540921 | $-0.514721 \times 10^{26}$ | $5.22709 \times 10^{-2}$ | $-7.86678 \times 10^{-3}$ | $3.98223 \times 10^{-2}$ | $-1.75553 \times 10^{-2}$ |
| R5 | −0.16265054 | −145.600916 | $1.16124 \times 10^{-2}$ | $-4.25034 \times 10^{-3}$ | $8.70066 \times 10^{-3}$ | $-9.45865 \times 10^{-3}$ |
| R6 | −0.44766552 | −1.460779 | $2.29113 \times 10^{-2}$ | $1.48433 \times 10^{-2}$ | $-4.59842 \times 10^{-3}$ | $-1.92195 \times 10^{-4}$ |
| R7 | 0.31737955 | −46.831696 | $-2.04394 \times 10^{-2}$ | $8.80033 \times 10^{-3}$ | $-1.31226 \times 10^{-3}$ | $7.45454 \times 10^{-5}$ |
| R8 | 0.58790228 | −10.284512 | $-2.67233 \times 10^{-2}$ | $2.43255 \times 10^{-3}$ | $-2.60953 \times 10^{-4}$ | $2.43224 \times 10^{-5}$ |

The miniature optical system according to an implementation of the second embodiment can have the optical characteristics as shown in Tables 4 and 5.

TABLE 4

| Lens side | Curvature radius | thickness | Refractive index(n) | |
|---|---|---|---|---|
| Object side | infinity | 0 | | |
| R1 | 2.158 | 1.183 | 1.52 | Aspheric surface |
| R2 | −17.361 | 0.100 | | Aspheric surface |
| R3 | 7.004 | 0.554 | 1.844 | |
| R4 | 3.207 | 0.553 | | |
| R5 | −2.190 | 0.911 | 1.52 | Aspheric surface |
| R6 | −1.410 | 0.144 | | Aspheric surface |
| R7 | 12.434 | 0.930 | 1.52 | Aspheric surface |
| R8 | 2.363 | 0.771 | | Aspheric surface |
| R9 | infinity | 0.200 | 1.53 | |
| R10 | infinity | 0.488 | | |
| R11 | infinity | 0.195 | 2.53 | |
| R12 | infinity | 0.170 | | |
| Image side | infinity | −0.001 | | |

Table 4 shows numerical data of elements constituting the optical system according to the implementation of the second embodiment. In Table 4, the curvature radius is the curvature radius of the optical surface, and the thickness is the thickness of the optical surface expressed with a unit of min.

Table 5 shows numerical values of aspheric coefficients for each aspheric surface according to the implementation of the second embodiment.

TABLE 5

| | curvature | K | A | B | C | D |
|---|---|---|---|---|---|---|
| R1 | 0.46343570 | −0.263012 | $2.58537 \times 10^{-3}$ | $-4.62929 \times 10^{-3}$ | $1.72010 \times 10^{-3}$ | 0 |
| R2 | −0.05760172 | −162.435776 | $2.67119 \times 10^{-3}$ | $-7.79678 \times 10^{-3}$ | $5.75403 \times 10^{-3}$ | 0 |
| R5 | −0.45655952 | −3.542517 | $-5.66079 \times 10^{-2}$ | $5.35035 \times 10^{-2}$ | $-2.77256 \times 10^{-2}$ | 0 |
| R6 | −0.70918887 | −2.167402 | $-2.30580 \times 10^{-2}$ | $2.70682 \times 10^{-2}$ | $7.33045 \times 10^{-3}$ | $-3.24758 \times 10^{-3}$ |
| R7 | 0.08042560 | −1767.470226 | $-1.76748 \times 10^{-2}$ | $9.63748 \times 10^{-3}$ | $-1.38479 \times 10^{-3}$ | $4.85648 \times 10^{-5}$ |
| R8 | 0.42314054 | −16.405792 | $-1.80402 \times 10^{-2}$ | $-1.83735 \times 10^{-3}$ | $7.13002 \times 10^{-4}$ | $-6.49942 \times 10^{-5}$ |

When photographing a subject using the optical system according to embodiments of the present invention, various types of aberrations can occur due to incident light having various types of wavelengths, so that the image of the subject may be deformed due to the aberrations. For instance, spherical aberration, astigmatism aberration, and distortion may occur in the optical system. Thus, preferred embodiments of the optical system are designed such that the above aberrations are minimized or do not occur in the optical system.

Spherical aberration refers to a phenomenon where the image of the subject cannot be perfectly reproduced based on the wavelength of light when forming the image of the subject on a lens or a spherical mirror.

Astigmatism aberration refers to a phenomenon where an object point spaced apart from a main axis fails to form a completed image, but forms a blurred image having a ring shape or a radial shape.

In addition, distortion refers to a phenomenon where a straight portion of the subject is expressed as a curved portion in the image of the subject, as if the subject is curved inward or outward like a bobbin or a barrel.

The distortion may occur when each portion of the subject is magnified proportionally to the distance, although the whole image of the subject may not correspond to such magnification.

Figure 3A:
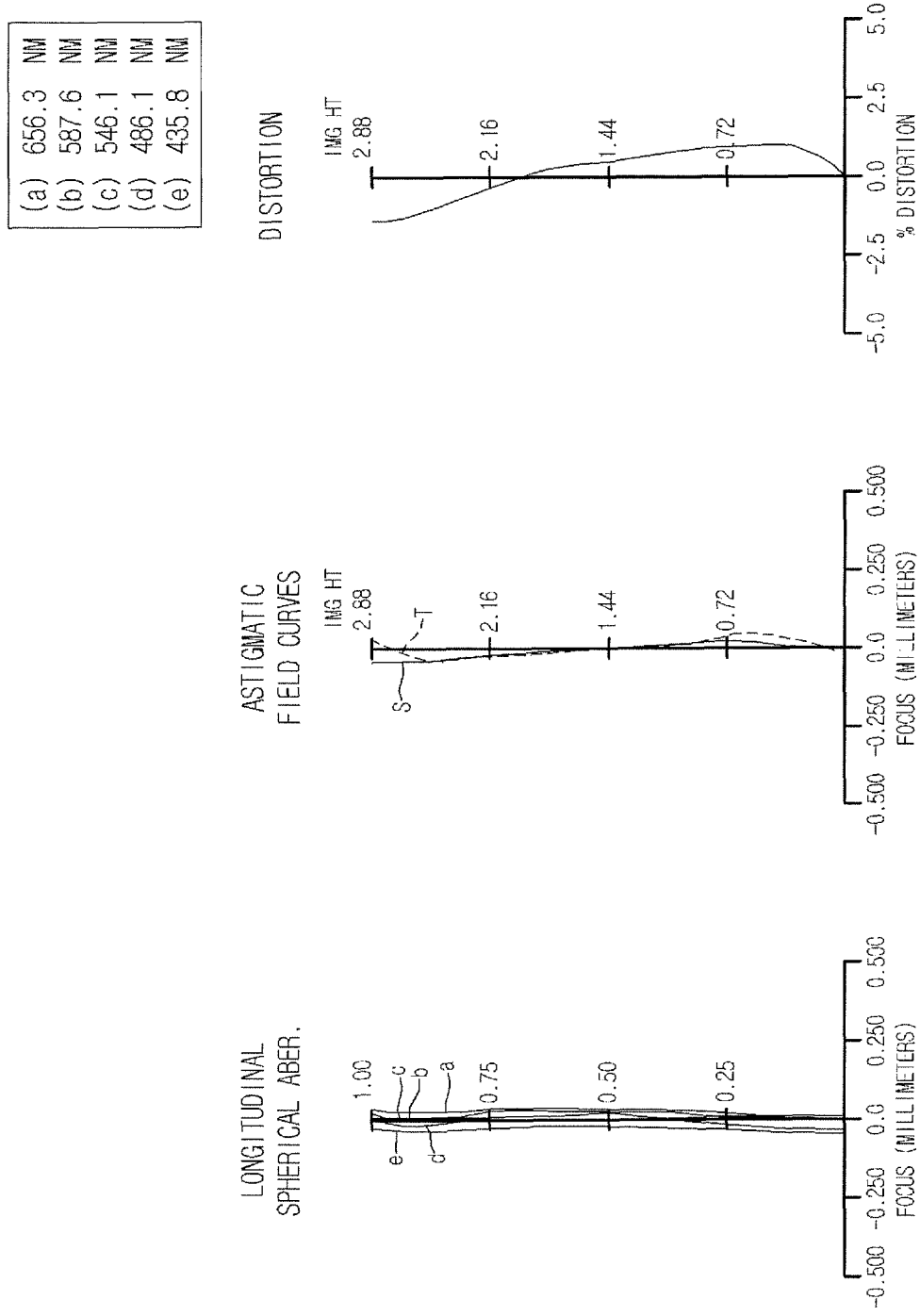
FIGS. 3A and 3B are graphs showing aberration characteristics of a miniature optical system according to the first embodiment.
Figure 3B:
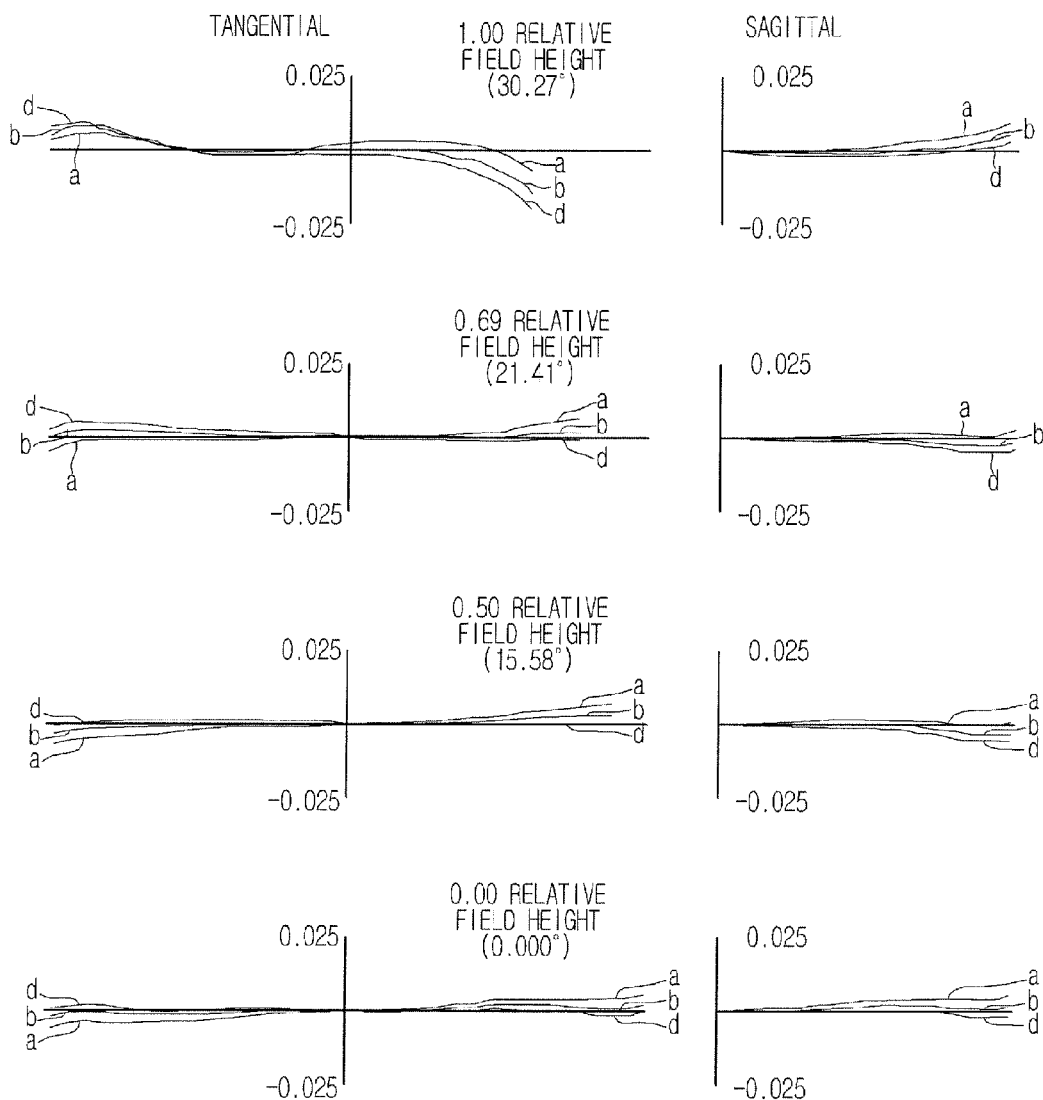

FIGS. 3A and 3B are graphs showing aberration characteristics of a miniature optical system according to the first embodiment. FIG. 3A shows longitudinal spherical aberration, astigmatic aberration, and distortion, and FIG. 3B shows coma aberration.

Figure 4A:
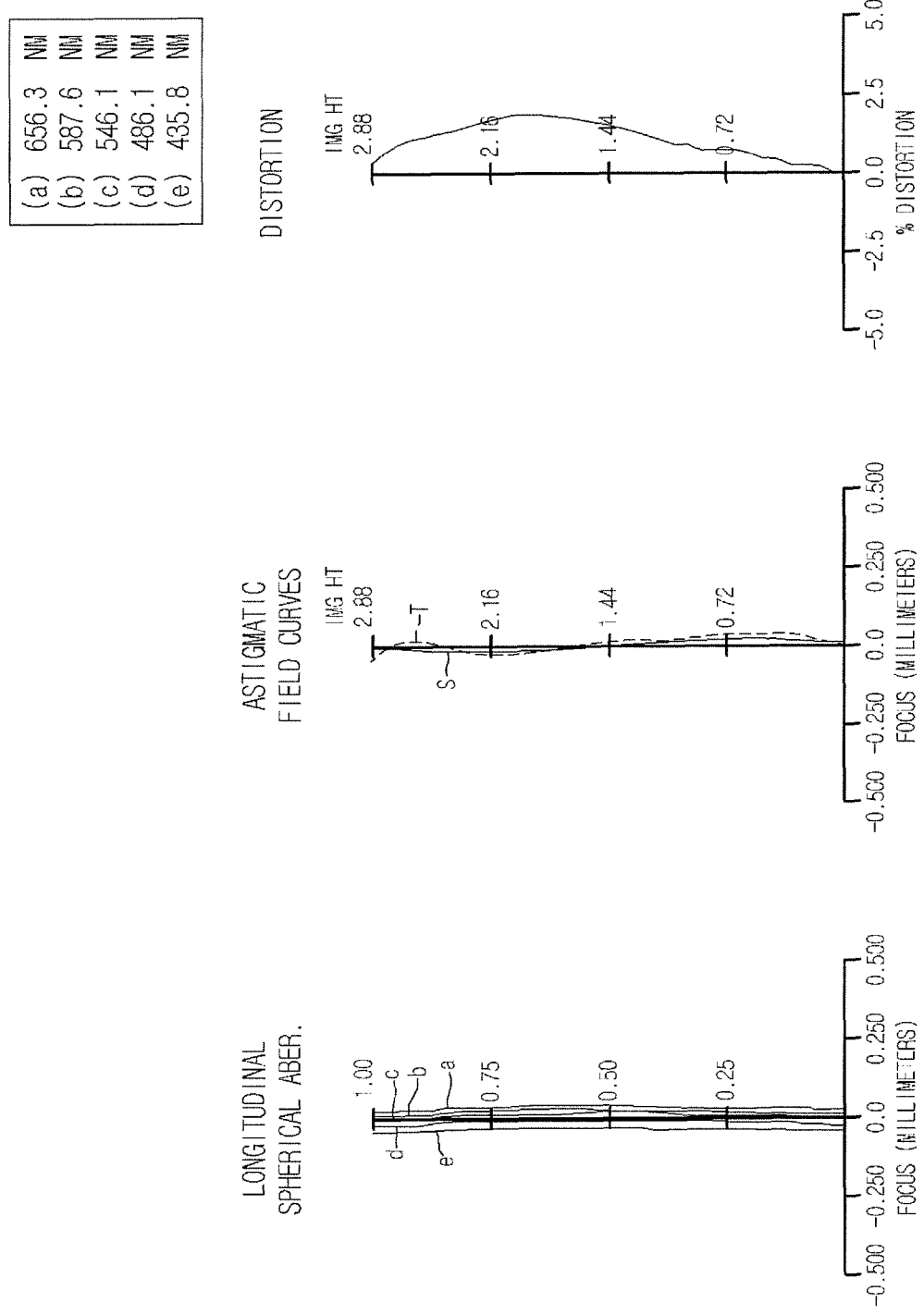
FIGS. 4A and 4B are graphs showing aberration characteristics of a miniature optical system according to the second embodiment.
Figure 4B:
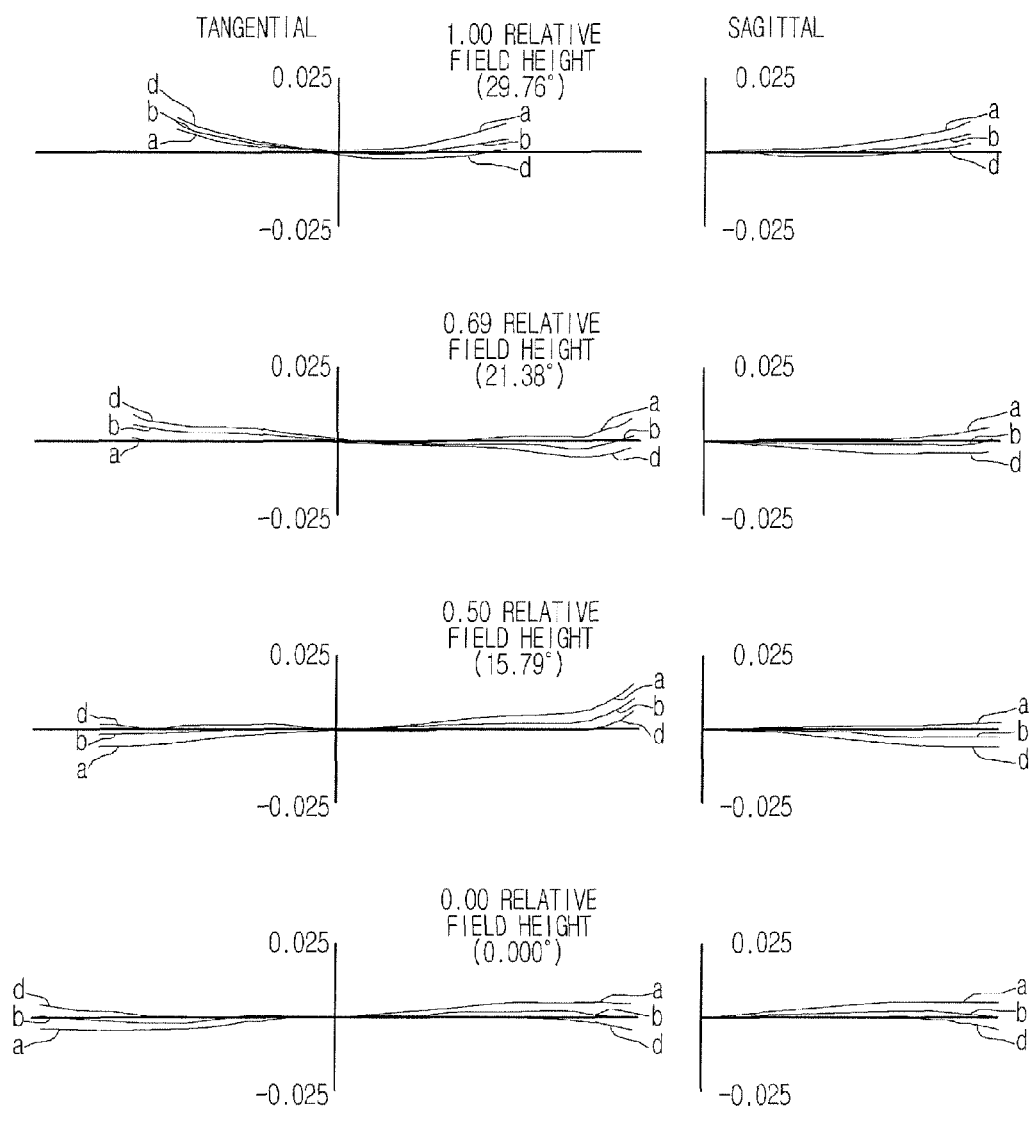

FIGS. 4A and 4B are graphs showing aberration characteristics of a miniature optical system according to the second embodiment. FIG. 4A shows longitudinal spherical aberration, astigmatic aberration, and distortion, and FIG. 4B shows coma aberration.

In FIGS. 3A and 4A, the spherical aberration occurs due to various types of wavelengths of light, the astigmatic aberration represents aberration characteristics of a tangential plane and a sagittal plane according to the image height, and the distortion shows the distortion degree according to the image height.

In FIGS. 3B and 4B, the coma aberration represents aberration characteristics of the tangential plane and the sagittal plane according to the relative field height and wavelengths of light.

As described above, according to certain embodiments, the miniature optical system employing four lenses can have a compact structure while realizing stable optical performance.

Therefore, the miniature optical system according to embodiments of the present invention can be used to install a high-pixel camera function in a small-sized mobile communication appliance, such as a mobile communication terminal and a PDA.

Any reference in this specification to "implementation," "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A miniature optical system comprising:
   a first lens;
   a second lens;
   a third lens; and
   a fourth lens,
   wherein the first lens, the second lens, the third lens, and the fourth lens are sequentially aligned from an object side to an image side of the system, and satisfy $-1.5 < f2/ttl < -0.5$, where f2 is a focal length of the second lens and ttl is a distance from the object side of the first lens to the image side of the system;
   wherein the miniature optical system satisfies $0.2 < f1/ttl < 0.7$, where f1 is a focal length of the first lens;
   wherein the miniature optical system satisfies $0.7 < f3/ttl < 1.2$, where f3 is a focal length of the third lens;
   wherein the miniature optical system further satisfies $-1.7 < f4/ttl < -0.8$, where f4 is a focal length of the fourth lens;
   wherein an image side surface of the second lens and an object side surface of the second lens are both spherical; and
   wherein a convex surface of the second lens is located at the object side;
   wherein the first lens and the third lens have positive refractive power, and wherein the second lens and the fourth lens have negative refractive power,
   wherein a refractive power of the first lens is greater than that of each of the second, third, and fourth lenses,
   wherein the first lens, the third lens, and the fourth lens comprise plastic material, and wherein the second lens comprises glass material,
   wherein n2/ttl is greater than n1/ttl, n3/ttl, and n4/ttl, and wherein n1/ttl, n3/ttl, and n4/ttl each have the same value, where n1 is a refractive index of the first lens, n2 is a refractive index of the second lens, n3 is a refractive index of the third lens, and n4 is a refractive index of the fourth lens.

2. The miniature optical system according to claim 1, wherein a thickness of the second lens is smaller than that of the first lens.

3. The miniature optical system according to claim 1, wherein the second lens has a meniscus shape comprising a convex surface on the object side thereof.

4. The miniature optical system according to claim 1, wherein the third lens has a meniscus shape comprising a concave surface on the object side thereof.

5. The miniature optical system according to claim 1, wherein the fourth lens has a meniscus shape comprising a convex surface on the object side thereof.

6. The miniature optical system according to claim 1, wherein an image side surface of the first lens and an object side surface of the first lens are both convex, and wherein the second lens has a meniscus shape comprising a convex surface on the object side thereof.

7. The miniature optical system according to claim 1, wherein the third lens has a meniscus shape comprising a concave surface on the object side thereof, and wherein the fourth lens has a meniscus shape comprising a convex surface on the object side thereof.

8. The miniature optical system according to claim 1,
   wherein an image side surface of the first lens and an object side surface of the first lens are both convex,
   wherein the second lens has a meniscus shape comprising a convex surface on the object side thereof,
   wherein the third lens has a meniscus shape comprising a concave surface on the object side thereof,
   wherein the fourth lens has a meniscus shape comprising a convex surface on the object side thereof.

9. The miniature optical system according to claim 1, wherein an image side surface of the first lens and an object side surface of the first lens are both convex, and wherein the second lens has a meniscus shape having a concave surface on the image side thereof.

10. The miniature optical system according to claim 1, wherein at least one surface of the third lens is an aspheric surface, and wherein at least one surface of the fourth lens is an aspheric surface.

11. The miniature optical system according to claim 1, wherein $n2 > 1.7$, $n1 > 1.5$, $n3 > 1.5$, and $n4 > 1.5$.

12. The miniature optical system according to claim 1, wherein all surfaces of the first, third, and fourth lens are aspheric surfaces.

13. The miniature optical system according to claim 1, wherein an image side surface of the fourth lens has at least one aspheric point of inflection.

14. The miniature optical system according to claim 1, wherein all surfaces of the first, third, and fourth lens are aspheric surfaces, and wherein an image side surface of the fourth lens has at least one aspheric point of inflection.

15. A miniature optical system comprising:
    an iris;
    a first lens;
    a second lens;
    a third lens; and
    a fourth lens,
    wherein the iris, the first lens, the second lens, the third lens, and the fourth lens are sequentially aligned from an object side to an image side of the system, and satisfy $-1.5 < f2/ttl < -0.5$, where f2 is a focal length of the second lens and ttl is a distance from the object side of the first lens to the image side of the system,
    wherein the miniature optical system satisfies $0.2 < f1/ttl < 0.7$, where f1 is a focal length of the first lens;
    wherein the miniature optical system satisfies $0.7 < f3/ttl < 1.2$, where f3 is a focal length of the third lens;
    wherein the miniature optical system satisfies $-1.7 < f4/ttl < -0.8$, where f4 is a focal length of the fourth lens;
    wherein a refractive power of the first lens is greater than that of each of the second, third, and fourth lenses,
    wherein a convex surface of the second lens is located at the object side,
    wherein an image side surface of the second lens and an object side surface of the second lens are both spherical,
    wherein the first lens and the third lens have positive refractive power, and wherein the second lens and the fourth lens have negative refractive power,
    wherein the first lens, the third lens, and the fourth lens comprise plastic material, and wherein the second lens comprises glass material,
    wherein an image side surface of the first lens and an object side surface of the first lens are both convex,
    wherein the second lens has a meniscus shape comprising a convex surface on the object side thereof,
    wherein the third lens has a meniscus shape comprising a concave surface on the object side thereof,
    wherein the fourth lens has a meniscus shape comprising a convex surface on the object side thereof,
    wherein n2/ttl is greater than n1/ttl, n3/ttl, and n4/ttl, and wherein n1/ttl, n3/ttl, and n4/ttl each have the same value, where n1 is a refractive index of the first lens, n2 is a refractive index of the second lens, n3 is a refractive index of the third lens, and n4 is a refractive index of the fourth lens,
    wherein $n2 > 1.7$, $n1 > 1.5$, $n3 > 1.5$, and $n4 > 1.5$.

* * * * *